(12) United States Patent
Veeraraghavan et al.

(10) Patent No.: US 8,364,781 B2
(45) Date of Patent: *Jan. 29, 2013

(54) CONTENT TARGETING WITH AUDIENCES

(75) Inventors: Venkatesh Veeraraghavan, Seattle, WA (US); Lin Huang, Redmond, WA (US); Targo Tennisberg, Bothell, WA (US); Nathan Fink, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 14 days.

This patent is subject to a terminal disclaimer.

(21) Appl. No.: 12/967,055

(22) Filed: Dec. 14, 2010

(65) Prior Publication Data

US 2011/0119591 A1     May 19, 2011

Related U.S. Application Data

(63) Continuation of application No. 10/782,563, filed on Feb. 18, 2004, now Pat. No. 7,853,665.

(51) Int. Cl.
*G06F 15/16*     (2006.01)
*G06F 3/00*     (2006.01)
(52) U.S. Cl. ...................... 709/217; 715/730
(58) Field of Classification Search .................. None
See application file for complete search history.

(56) References Cited

U.S. PATENT DOCUMENTS

| | | | |
|---|---|---|---|
| 6,016,394 A * | 1/2000 | Walker | 717/104 |
| 6,871,232 B2 * | 3/2005 | Curie et al. | 709/225 |
| 7,143,439 B2 * | 11/2006 | Cooper et al. | 726/11 |
| 7,363,650 B2 * | 4/2008 | Moriconi et al. | 726/1 |
| 7,478,422 B2 * | 1/2009 | Valente et al. | 726/4 |
| 7,506,307 B2 * | 3/2009 | McCollum et al. | 717/117 |
| 7,552,481 B2 * | 6/2009 | Moona et al. | 726/26 |
| 7,783,765 B2 * | 8/2010 | Hildebrand et al. | 709/229 |
| 7,912,930 B1 * | 3/2011 | Farooqi et al. | 709/223 |
| 7,966,493 B2 * | 6/2011 | Puri et al. | 713/176 |
| 2004/0210445 A1 * | 10/2004 | Veronese et al. | 705/1 |

* cited by examiner

*Primary Examiner* — Ranodhi Serrao
*Assistant Examiner* — Muktesh G Gupta
(74) *Attorney, Agent, or Firm* — Merchant & Gould PC

(57) ABSTRACT

The present invention provides a system and method for targeting content to audiences. The audience is defined by rules that may be based on properties as well as organizational structure associated with the users. Each of the rules is compiled to determine the group of members belonging to the rule. Logical operators are then applied to the groups to determine the audience membership. Compiling the rules enhances performance as the rules do not have to be run each time. Instead, a simple check against the rules results is performed. The rules making up the audience may be compiled at predetermined times in order to keep the audience up-to-date. Audiences are then selected and tagged to content so that the content may be viewed by the selected audiences.

10 Claims, 15 Drawing Sheets

CONTENT TARGETING WITH AUDIENCES

CROSS-REFERENCE TO RELATED APPLICATION

This application claims priority to U.S. patent application Ser. No. 10/782,563 entitled, "CONTENT TARGETING WITH AUDIENCES," filed Feb. 18, 2004, which will issue as U.S. Pat. No. 7,853,665 and is hereby incorporated by reference in its entirety as if set forth herein in full.

BACKGROUND OF THE INVENTION

Many organizations target content to particular individuals in order to provide them with relevant content. In order to target the content to a specific group of users, the organization determines a set of criteria that is associated with the content. When a user matches the set of criteria then the content is targeted toward them. For example, the set of criteria may be based on the user's demographic area, age, job, or some other aspect. Creating the group of users to which the content is targeted, however, can be very cumbersome. Generally, someone within an organization manually selects each of the members. For example, contacts may be used to create distribution lists. Not only is creating the lists difficult and time consuming, the lists typically become inaccurate after a period of time.

SUMMARY OF THE INVENTION

The present invention is directed towards providing a system and method for targeting content to an audience.

According to one aspect of the invention, rules are created to define the audience. The rules may be based on properties as well as organizational structure associated with individuals.

According to another aspect of the invention, the rules may be linked by operators. The linking allows more complex audience definitions to be formed. For example, logical operators may be used to link the rules.

According to another aspect of the invention, the rules are first compiled individually to create sets of member. The operators are then applied to the created sets of members to determine the final audience membership.

According to yet another aspect of the invention, the audience rules may be compiled at predetermined times. This helps to ensure that the audience membership is up-to-date. For example, the rules may be compiled daily, on certain days, weekly, monthly, or any other time period.

According to still yet another aspect of the invention, audiences are tagged to content. More than one audience may be tagged to the content. The tagging helps to filter the content to be delivered to the audience.

According to another aspect of the invention, a web interface provides access to the targeted content. For example, a new employee will see new employee information when they access their home page.

BRIEF DESCRIPTION OF THE DRAWINGS

FIG. 11 illustrates an exemplary edit audience definition screen;

FIG. 12 shows an exemplary view audience membership screen;

DETAILED DESCRIPTION OF THE PREFERRED EMBODIMENT

Generally, the present invention is directed towards providing a system and method for targeting content to audiences. The audience is defined by rules that may be based on properties as well as organizational structure associated with the users. Each of the rules is compiled to determine the group of members belonging to the rule. Logical operators are then applied to the groups to determine the audience membership. The rules making up the audience may be compiled at predetermined times in order to keep the audience up-to-date. Audiences are then selected and tagged to content so that the content may be viewed by the selected audiences.

Illustrative Operating Environment

Figure 1:
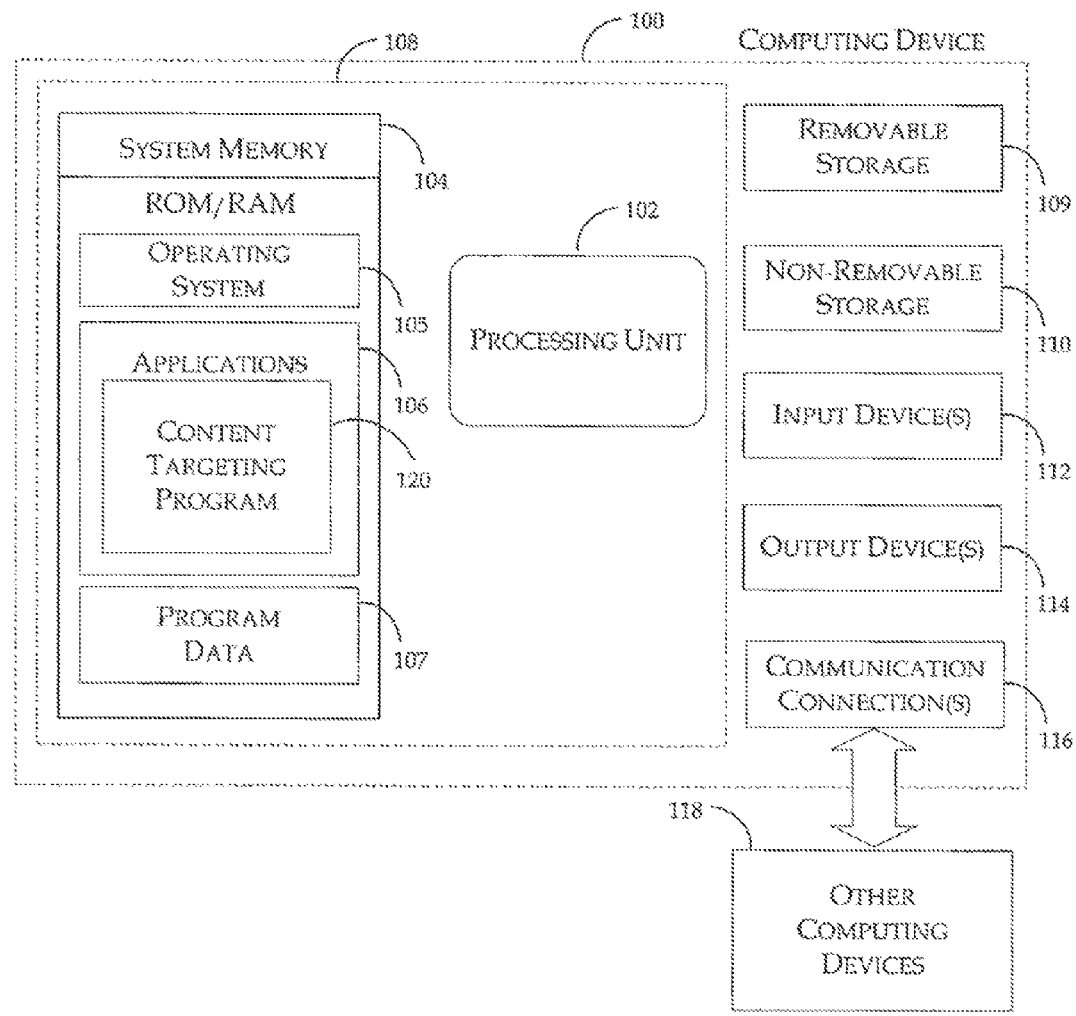
FIG. 1 illustrates an exemplary computing device that may be used according to exemplary embodiments of the present invention.

With reference to FIG. 1, one exemplary system for implementing the invention includes a computing device, such as computing device 100. Computing device may be configured as a client, a server, mobile device, or any other computing device that interacts with targeted content in a network based target content system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a content targeting application 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Content Targeting System

Figure 2:
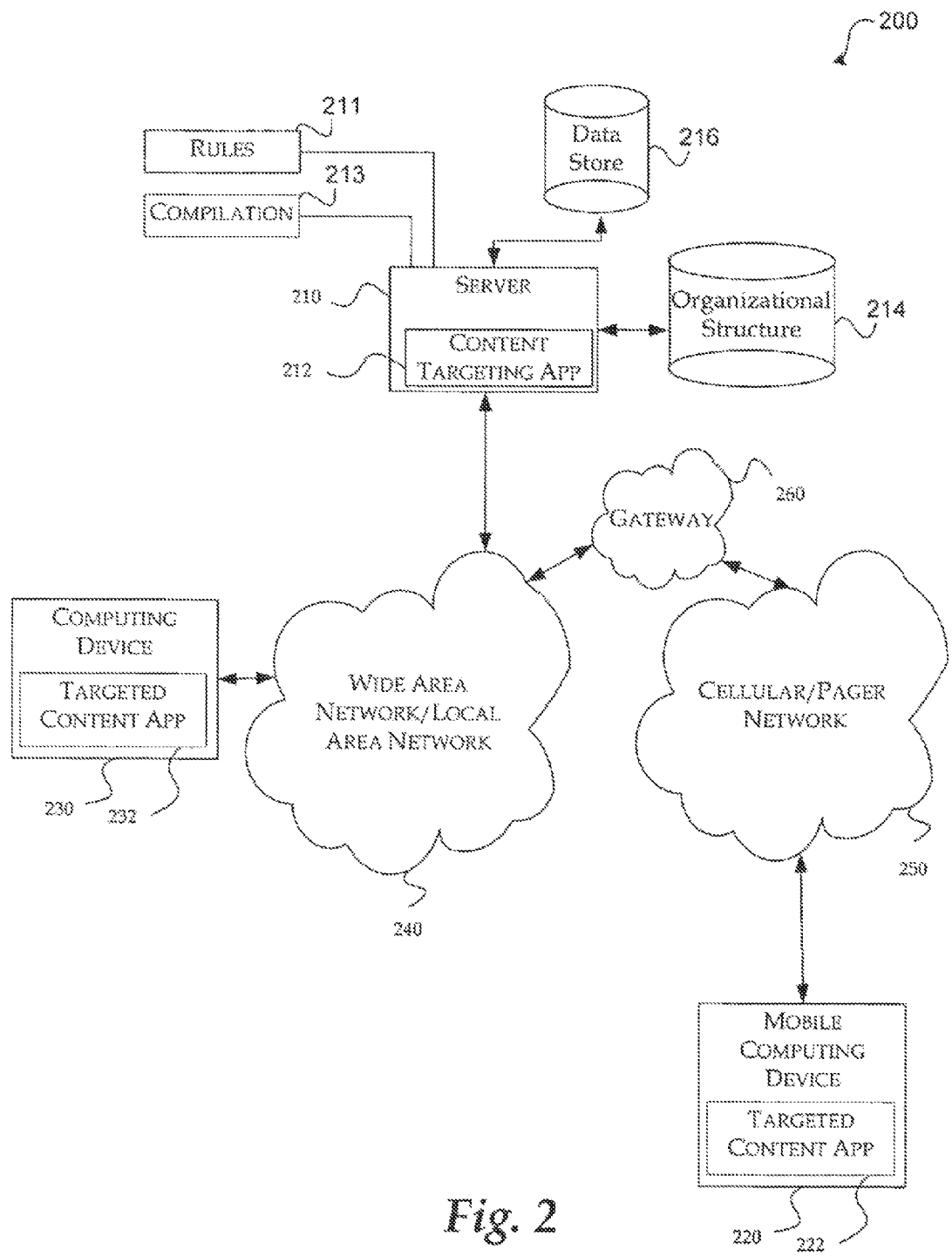
FIG. 2 is a functional block diagram generally illustrating a content targeting system.

FIG. 2 is a functional block diagram generally illustrating a content targeting system 200, in accordance with aspects of the invention. Server 210, computing device 230, and mobile computing device 220 may be computing devices such as the one described above in conjunction with FIG. 1.

Server 210 runs content targeting application 212. Generally, targeting application 212 is configured provide data and operations relating to providing content targeted to audiences members that is accessed by computing devices, such as computing device 230 and computing device 220. The targeted content stored at data store 216, or some other data store (not shown) may be transmitted over a wide area network (WAN)/local area network (LAN) 340 or a cellular pager/network to the clients. One example of a WAN is the Internet that connects millions of computers over a host of gateways, routers, switches, hubs, and the like. An example of a LAN is a network used to connect computers in a single office. A WAN may connect multiple LANs.

A targeted content application, such as 222 or 232 residing on mobile device 220 or computing device 230, is configured to receive targeted content from server 210. Applications 222 and 232 and targeting application 212 may communicate using any one of several client-server protocols.

Cellular/pager network 250 is a network responsible for delivering messages to and receiving messages from wireless devices. The cellular/pager network 250 may include both wireless and wired components. For example, cellular/pager network may include a cellular tower that is linked to a wired telephone network. Typically, the cellular tower carries communication to and from mobile devices, such as cell phones, notebooks, pocket PCs, long-distance communication links, and the like.

Gateway 260 routes messages between cellular/pager network 250 and WAN/LAN 240. For example, server 210 may send targeted content to mobile computing device 220 that is associated with a particular audience member that is tagged to receive the content. Gateway 260 provides a means for transporting the message from the WAN/LAN 340 to cellular/pager network 250. Conversely, a user with a device connected to a cellular network may be accessing the Web. Gateway 260 allows hyperlink text protocol (HTTP) messages to be transferred between WAN/LAN 240 and cellular/pager network 250. According to one embodiment, content targeting application 212 provides HTML code to the targeted content applications on the clients that enables their browser to display the targeted content.

Audiences are defined by a set of rules (211). The rules can include individuals who are members of pre-existing lists or groups as well as define a rule based on an organizational structure. Any number of rules may be combined to define a specific audience. Once the Audience is created, content targeting system 200 is used to target the content to the audience.

Audiences to receive the targeted content may be created using a number of data stores, such as data store 216 and organizational structure data store 214. The data sources may include items, such as distribution lists, security groups, and organizational structure. Generally, within an organization, there are two places where members for audiences already exist. The first is based on distribution lists (mailing lists), and the second is security groups, such as NT security groups. Using these pre-existing definitions allows audiences to be created quickly. For instance, a geography based distribution list could be imported and used to provide locale specific content, such as 401K information for all US employees. Combining these lists with organizational structure helps to target content to specific groups of users.

The organizational structure may be used to find individuals within an organization based on their role. For example, the organizational structure could be used to find all people who report under a vice president within a specific division and who have certain characteristics, such as all people within the organization whose title is 'Attorney.'

Each rule defining the audience may be combined using any combination of logical operators, such as (AND, OR, and (,)), to link the rules and create an audience definition. For example, the following is an exemplary rule grammar: Organizational Rule::=Rule|'(' Rule ')'|Rule 'AND'Rule|Rule 'OR' Rule.

According to one embodiment of the invention, there are three different rule types. The first rule type is a property query that may be expressed as: Rule::=<property><operator><value>. This is an attribute based rule type. The property includes items associated with a user profile. For example the property may include items such as: last name, first name, telephone number, title, and the like. The operator is selected from a group of logical operators, including: EQUALS; NOT EQUALS; LESS THAN; LESS THAN OR EQUAL; GREATER THAN; GREATER THAN OR EQUAL; CONTAINS; and NOT CONTAINS. According to one embodiment, the operators are selected based on a property data type. The <value> is supplied by the user. An exemplary property rule is: Last Name EQUALS Smith or Title CONTAINS "Program Manager."

The second rule type is the 'MEMBER OF' rule type. This rule is a member type rule. This rule type may be expressed as: 'MEMBER OF'<Distribution List/Security Group>. Pre-existing groups can be used as Audience definitions using this rule type. Audience definitions can be created explicitly using the rule 'Name==<Username>. The MEMBER OF rules type allows individuals to be selected from particular audiences. For example, audience members could be selected from a new employees distribution list or security group.

The third rule type is the reports under rule type. This rule type may be expressed as: 'REPORTS UNDER'<user>. This type of rule is an organizational rule type and <user> is a user who exists within the organization.

The Reports Under operator is used to create organization based Audiences such as all reports of the Division Vice-President. According to one embodiment, the information used to derive this audience definition is stored in the user profile database. The information may be stored in other locations, such as an external directory. To compute this definition, the Audience definition compiler uses the "Manager" system property. The person on whom the Reports Under rule is applied will show up in the list of people in that Audience because we expect this feature to be used for creating Audiences for entire divisions or teams. According to one embodiment of the invention, a Microsoft Active Directory is accessed to determine the user profiles which is then used to create the organizational structure. The organizational structure, however, may be created from any data source containing the relevant user information.

Another component of the content targeting system is compilation component 213. Compilation component 213 compiles the list of rules defining the audience to determine the audience members. The compilation occurs in two stages. In the first stage, each of the rules is individually compiled to determine members that meet the rule conditions. In the second stage, the logical operators connecting the list of rules is applied in the order given in the audience definition to create the final group comprising the audience. According to one embodiment, the rules, compiled rule results, targeted link lists and related data are stored in a SQL database.

For example, a rule can be created, such as "REPORTS UNDER Vice President of Program Development AND whose Title EQUALS "Program Manager." In the present example, stage 1 creates two sets of people. The first set include all people who report under the Vice President of Program Development. The second-set includes all people whose Title is "Program Manager." In stage 2, the logical operator AND is applied between the two sets. The audience is the intersection between the sets.

According to one embodiment, prior to evaluating the REPORTS UNDER rule, a preprocessing step evaluates the organization hierarchy and assign each node in the tree a value. Performing this step helps to express the REPORTS UNDER rule as a simple SQL query instead of a recursive set of queries.

Running a query to determine who is affected by an audience rule can take a considerable amount of time. Therefore, according to one embodiment of the invention, the results of the rule queries are computed in advance and stored in data store 216 for easy access.

Figure 3:
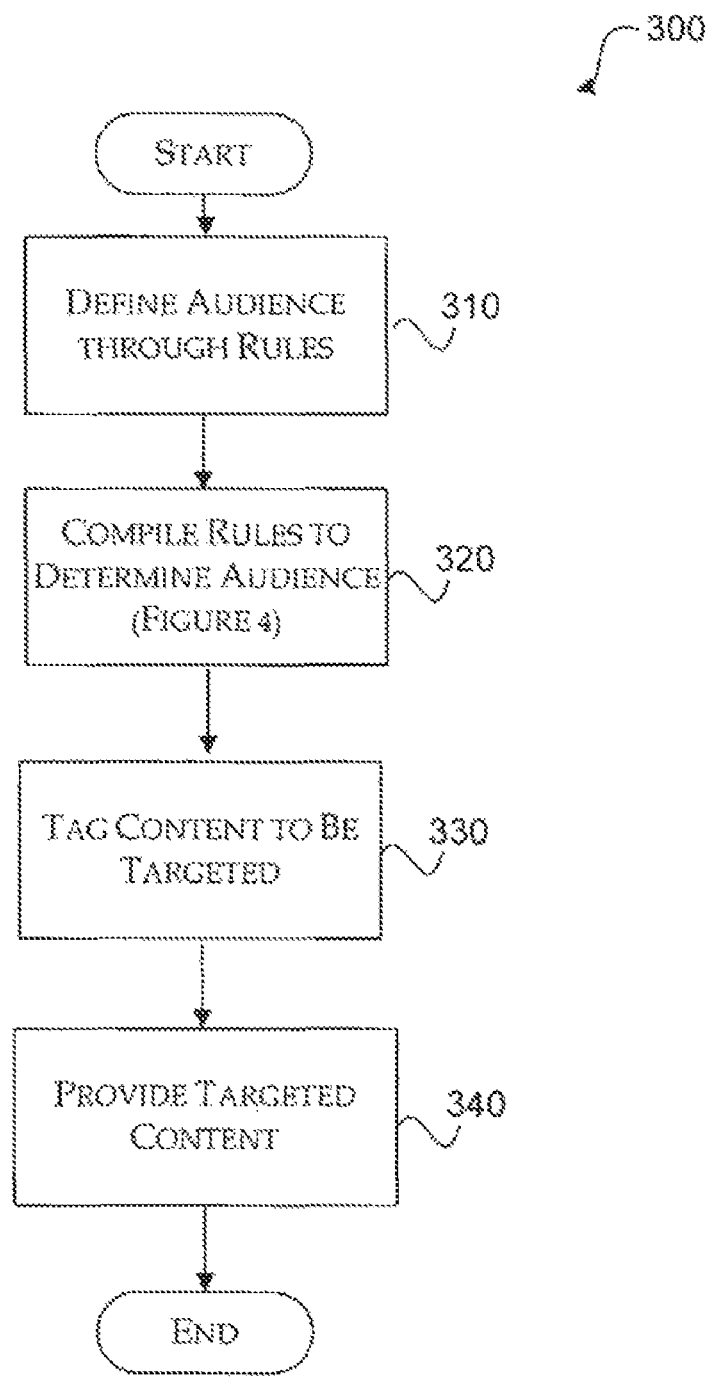
FIG. 3 illustrates a process for targeting content to an audience.

FIG. 3 illustrates a process for targeting content to an audience, in accordance with aspects of the present invention. After a start block, the process moves to block 310 where rules are created to define an audience. As discussed above, the rules may be based on organizational structure as well as attributes associated with individuals.

Moving to block 320, the rules are compiled to determine the audience members. Each of the individual rules making up the audience definition is compiled creating a group of people. The logical operators connecting the rules are then applied to create the final audience. The rules may be compiled at a predetermined frequency in order to keep the audience membership current. For example, the rules could be compiled daily, weekly, hourly, monthly, or some other frequency.

Flowing to block 330 the content to be targeted to an audience is tagged. The tag is used to indicate that the audience should receive the content. More than one audience may be tagged to the content.

Next, at block 340 the targeted content is provided to the appropriate audiences. According to one embodiment, the targeted content is presented through a web interface. The process then steps to an end block.

Figure 4:
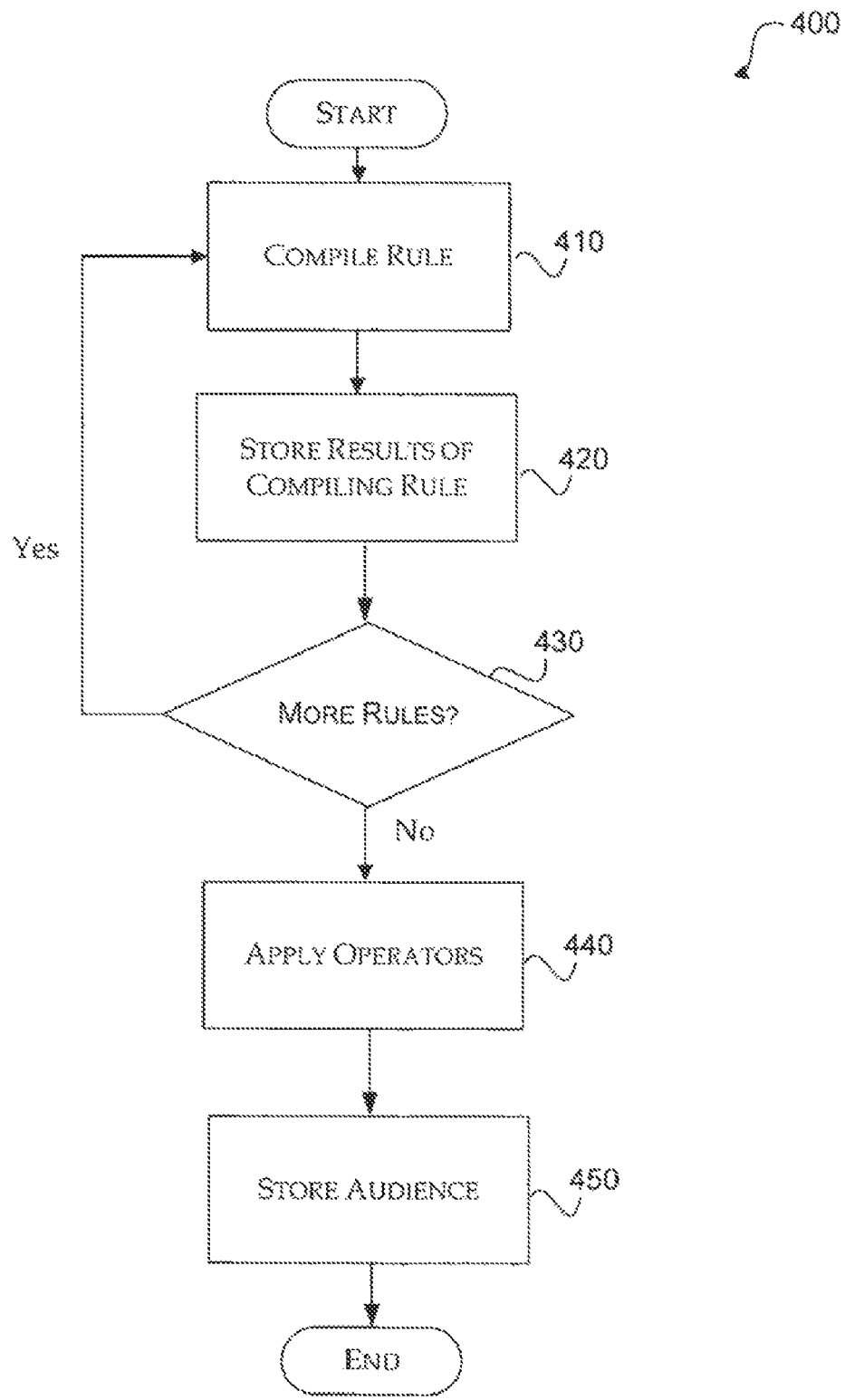
FIG. 4 illustrates a process for compiling rules to determine audience membership.

FIG. 4 illustrates a process for compiling rules to determine audience membership, in accordance with aspects of the present invention. After a start block, the process flows to block 410 where the first rule defining the audience is compiled. The compilation of the single rule determines members meeting the criteria of that rule. Moving to block 420, the members obtained from applying the rule are stored in a data store. Flowing to decision block 420, a determination is made as to whether there are any more rules defining the audience. When there are more rules, the process returns to block 410. When there are not more rules, the process flows to block 440 where the logical operators linking the rules are applied to the results of each individual rule compilation. In other words, each rule represents a set of people and the operators represent the union and intersection of the sets of people. Moving to block 450, the audience members are stored. The process then moves to an end block.

Figure 5:
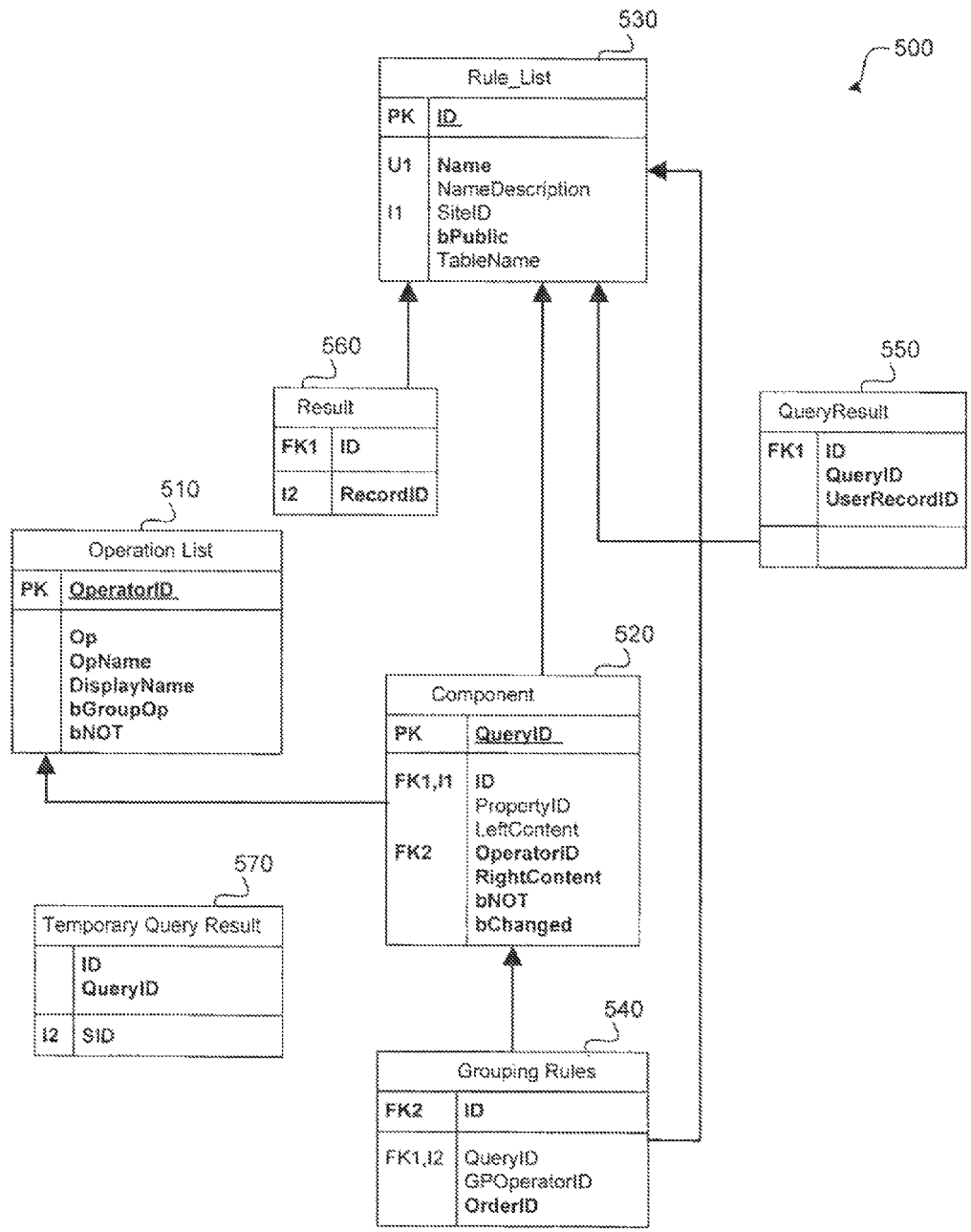
FIG. 5 illustrates a block diagram of a content targeting database structure.

FIG. 5 illustrates a block diagram of a content targeting database structure, in accordance with aspects of the present invention.

Operation list 510 stores the supported operations that are applied to the rules. According to one embodiment, the list of operations include: EQUALS; NOT EQUALS; LESS THAN; LESS THAN OR EQUAL; GREATER THAN; GREATER THAN OR EQUAL; CONTAINS; and NOT CONTAINS.

Component box 520 includes the elementary rules making up the audience definition without the logical grouping operators.

Rule list 530 contains the list of complete rules defining the audience.

Grouping rules 540 contains the rule grouping information to be applied to the rules listed in component 520. For example, (<rule1> AND <rule2> OR <rule3>).

Query result 550 contains the members resulting from applying the rules listed in component 520.

Result 560 contains the list of audience members as determined by applying the operators to the query results.

Temporary query result 570 is a temporary query result from applying the rules listed in component 520.

In order to simplify creating audiences and targeting content, many different tools are provided to the user through a web-based interface to create and manage audiences.

Figure 6:
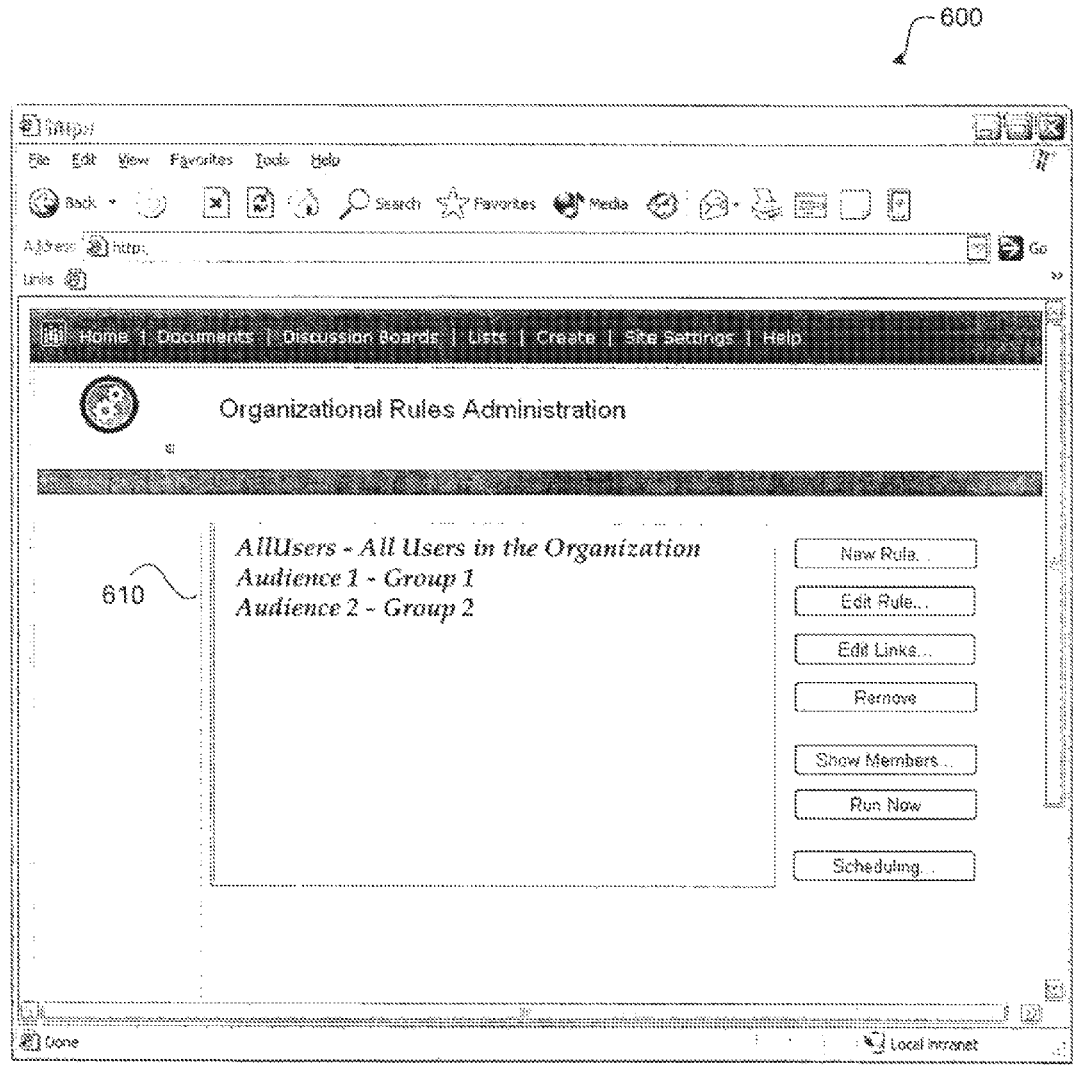
FIG. 6 illustrates an exemplary organizational rules administration screen.

FIG. 6 illustrates an exemplary organizational rules administration screen, in accordance with aspects of the invention. Screen 600 displays a list of existing organizational rules (610) defining audiences that are currently in the content targeting system. From screen 600, a user may select: the new rule button to add a rule; the edit rule button to edit an existing rule; the edit links button to edit associated links that are associated with a rule; the remove button to delete a rule; the show members button to show the members of the audience; the run now button to compile a rule; and the scheduling button to schedule the compilation of the rules.

Figure 7:
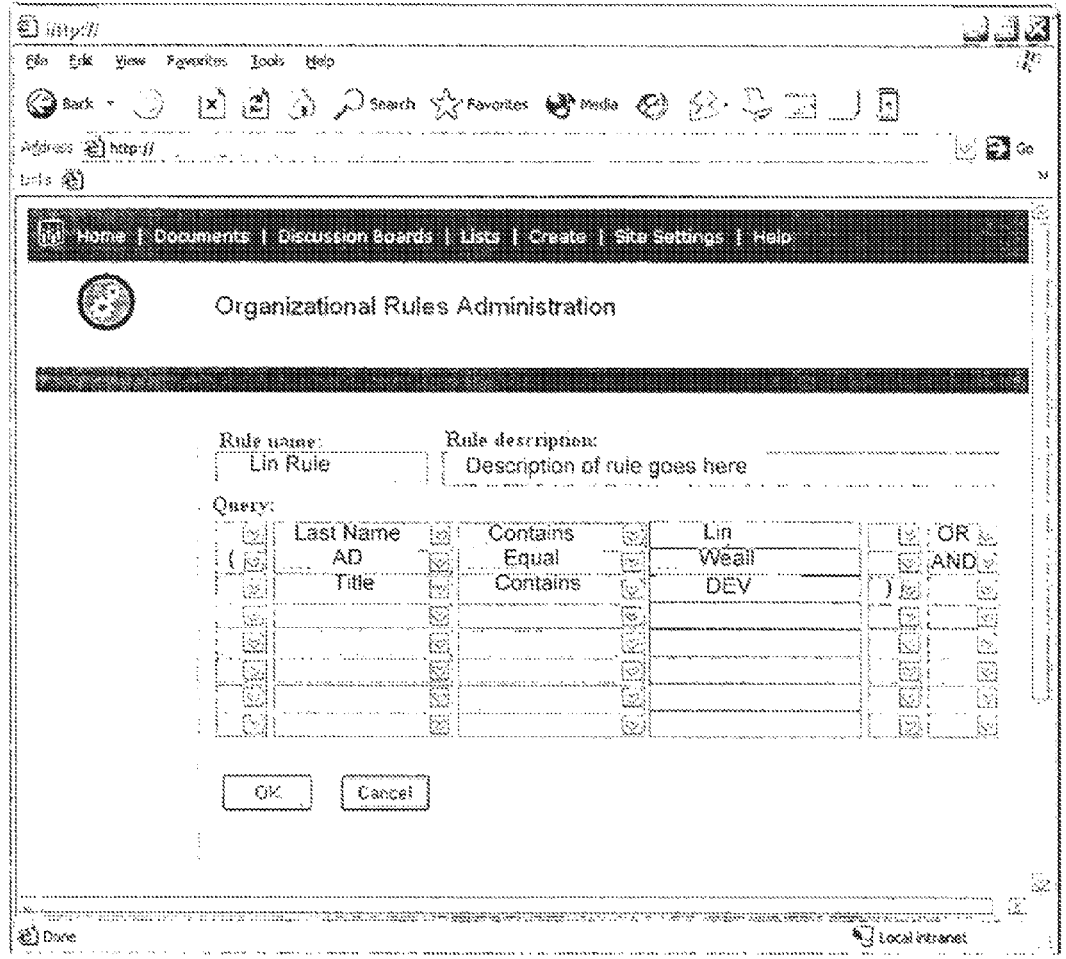
FIG. 7 illustrates an exemplary single organizational rule editing screen.

FIG. 7 illustrates an exemplary single organizational rule editing screen, in accordance with aspects of the invention. Editing screen 700 includes fields for the rule name, rule description, and a query UI that allows a user to input rule parameters.

Editing screen 700 is initially populated from audience definition stored in the rules database. The following is an exemplary rule storage definition for the rule displayed in FIG. 7.

| PropertyName | LeftContent | OpName | RightContent | OrderID |
|---|---|---|---|---|
| Last Name | NULL | Contains | Lin | 1 |
| NULL | NULL | OR | NULL | 2 |
| NULL | NULL | ( | NULL | 3 |
| NULL | AD | Equal | Weall | 4 |
| NULL | NULL | AND | NULL | 5 |
| Title | NULL | Contains | DEV | 6 |
| NULL | NULL | ) | NULL | 7 |

As can be seen, each operation is broken into discrete components within the database. When the user selects the OK button, the rule is validated. First, any blank clauses are removed from the rule. Next, blank fields are identified and shown as errors to the user. For example, "Missing "Property" in clause <1 . . . 5>"; "Missing a "Value"; and "Missing "AND/OR" between clause <1 . . . 5> and clause <1 . . . 5>." The number of open parenthesis is checked to determine if it is the same as the number of closed parenthesis. The type of the value is checked to ensure that it is the same as the type of attribute used. For example, a number attribute has a number in the value field. Type mismatch is also checked. For example, attribute <propname> expects "Value" of <type>.

According to one embodiment, after the rule is validated, the query is stored as an XML representation. The following is an exemplary XML format of the illustrated query:

```
<AUDIENCE_ORGANIZATION_RULE>
< ORGANIZATION_RULE ="Lin Rule">
<QUERY LeftContent="Last Name" Property="1" Operator="="
RightContent="lin">
</QUERY>
<QUERY GroupOperator="OR">
</QUERY>
<QUERY GroupOperatot="(">
</QUERY>
<QUERY LeftContent="AD" Property="0" Operator="="
RightContent="weall">
</QUERY>
<QUERY GroupOperator="AND">
</QUERY>
<QUERY LeftContent="Title" Property="1" Operator="Contains"
RightContent="DEV">
</QUERY>
<QUERY GroupOperator=")">
</QUERY>
</ORGANIZATION_RULE >
</AUDIENCE_ORGANIZATION_RULE >
```

Figure 8:
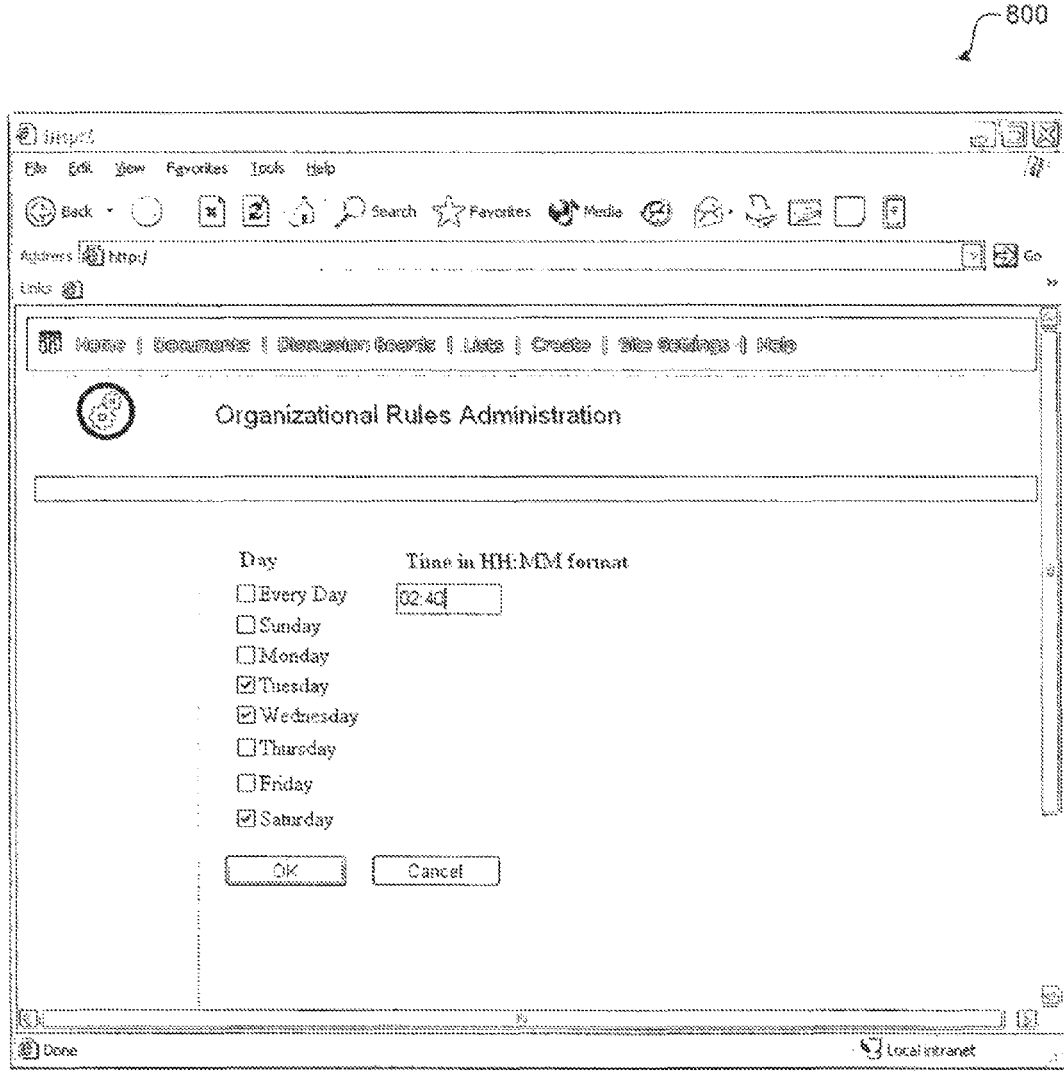
FIG. 8 shows an exemplary scheduling screen.

FIG. 8 shows an exemplary scheduling screen, in accordance with aspects of the invention. Selecting the scheduling button illustrated in FIG. 6 brings the user to scheduling screen 800.

Scheduling screen 800 allows an individual to specify how often and when the rules are compiled. As can be seen, the user has decided to compile the rules on Tuesday, Wednesday, and Saturday at 2:40 AM. Other time periods may also be specified. For example, the rule compilation may be scheduled to run daily, weekly, monthly, or on certain days at certain times.

According to one embodiment, the scheduling is processed as a SQL job. The SQL job enumerates the elementary rule definitions and then for Profile queries the SQL job executes the query over the profile table and for Active Directory (AD) queries the SQL job invokes the AD rules compiler.

According to another embodiment, the scheduling is processed using an NT scheduler. The rules are scheduled to be run by the NT scheduler and then for profile queries the NT scheduler invokes a stored procedure in a SQL server and for AD queries the NT scheduler invokes the AD rules compiler.

Figure 9:
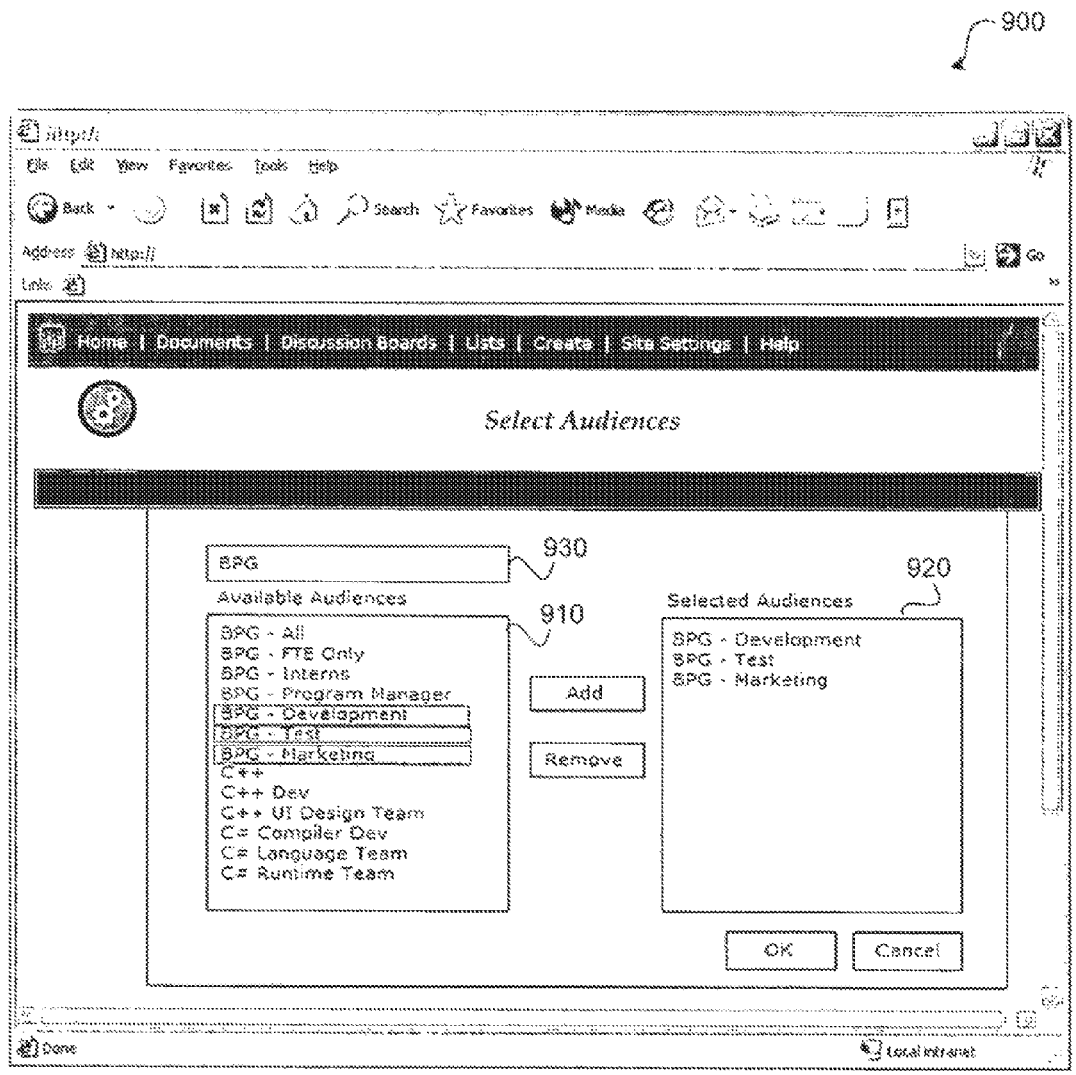
FIG. 9 illustrates an audience chooser.

FIG. 9 illustrates an audience chooser, in accordance with aspects of the present invention. A user is presented with audience screen 900 to choose the audiences to receive targeted content. When the audience chooser is instantiated for the first time, all stored audiences are shown in the available audiences list box (910).

Audiences are shown in only one of the list boxes (910 and 920). If an audience is moved from available audiences list box 910 to selected audiences list box 920, that audience, or group of audiences, is removed from the available audiences list box. In the example screen illustrated, the BPG—Development, BPG—Test, and BPG—Marketing audiences will be removed from available audiences list box 910 since they were added to selected audiences list box 920.

Search text may be entered into filter box 930 to narrow the list of available audiences. For example, in this scenario, the user has typed "BPG." The filter may contain all of the name or part of the name. The available audiences list is now shown with the first item that starts with text entered in the box. This list is updated upon the entry of every character into filter box 930.

Once the audiences are selected to receive the targeted content, the targeted content may be provided to the selected audience members. According to one embodiment, the targeted content is delivered over a network based web interface. For example, when an user accesses a web page having targeted content, all categories and listings that are applicable to the user are shown.

Figure 10:
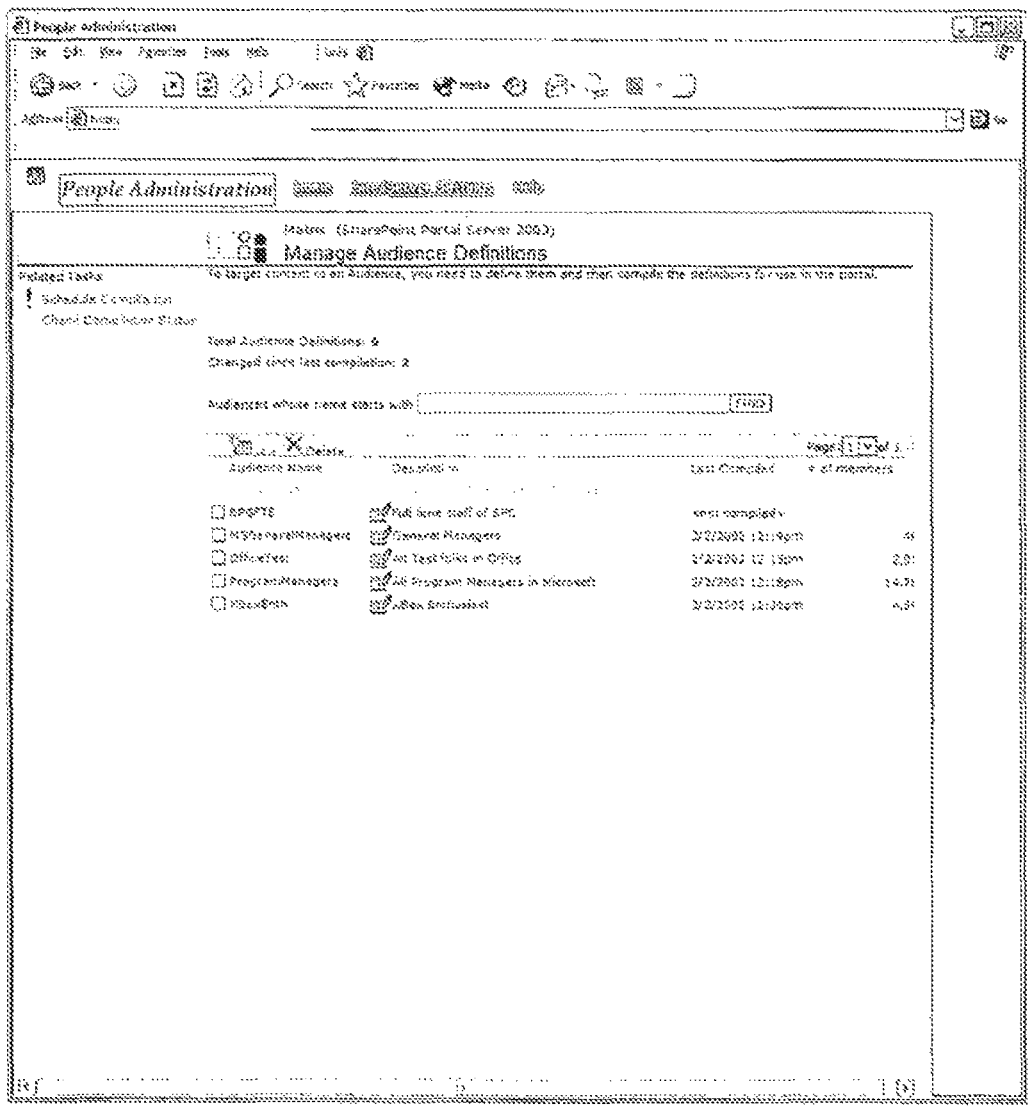
FIG. 10 shows an exemplary manage audience definitions screen.

FIG. 10 shows an exemplary manage audience definitions screen, in accordance with aspects of the invention.

Manage audience definitions screen 1000 shows a list of audience definitions. Screen 1000 includes an audience name field, a description field, a last compiled field, and a number of members field.

The audience name lists the name of the audience. The description field provides a brief description of the audience. The last compiled field reports the status of the compilation for the audience. For example, the last compiled filed may indicate the time of the last compilation for the audience, or it may indicate that the audience has not been compiled. The number of members field indicates the number of members in the audience determined at the last compile time.

Figure 11:
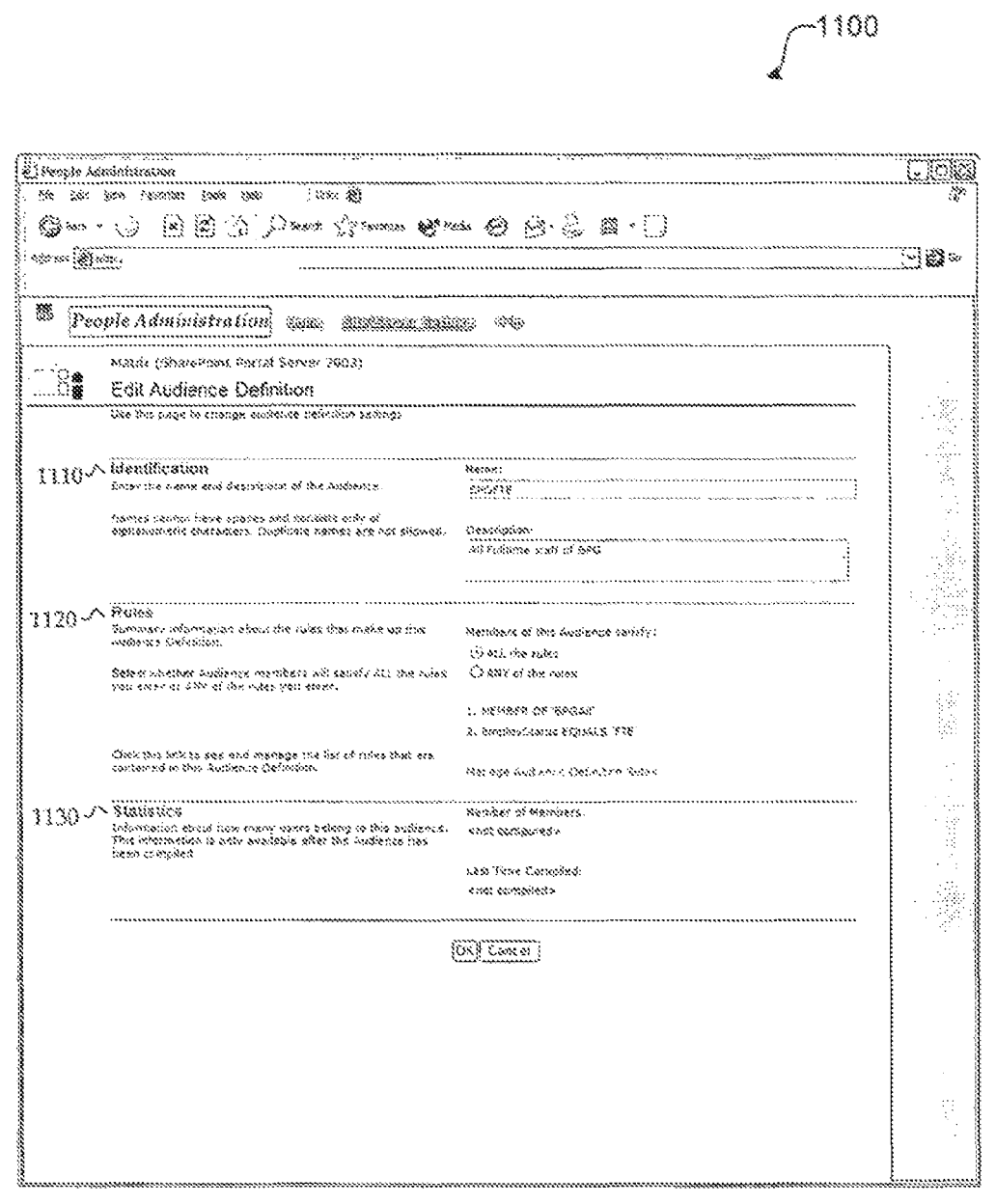

FIG. 11 illustrates an exemplary edit audience definition screen, in accordance with aspects of the invention. Edit audience definition screen 1100 identifies the rule in identification section 1110, shows a list of the rules in rules section 1120, and provides statistical information relating to the rule in statistics section 1130. According to one embodiment, the rules are listed on the page in a read only manner so that the user can see all the rules that make up the audience definition. The example audience definition (BPGFTE) includes rules to identify users who are member of "BPGAIL" and are full time employees.

Figure 12:
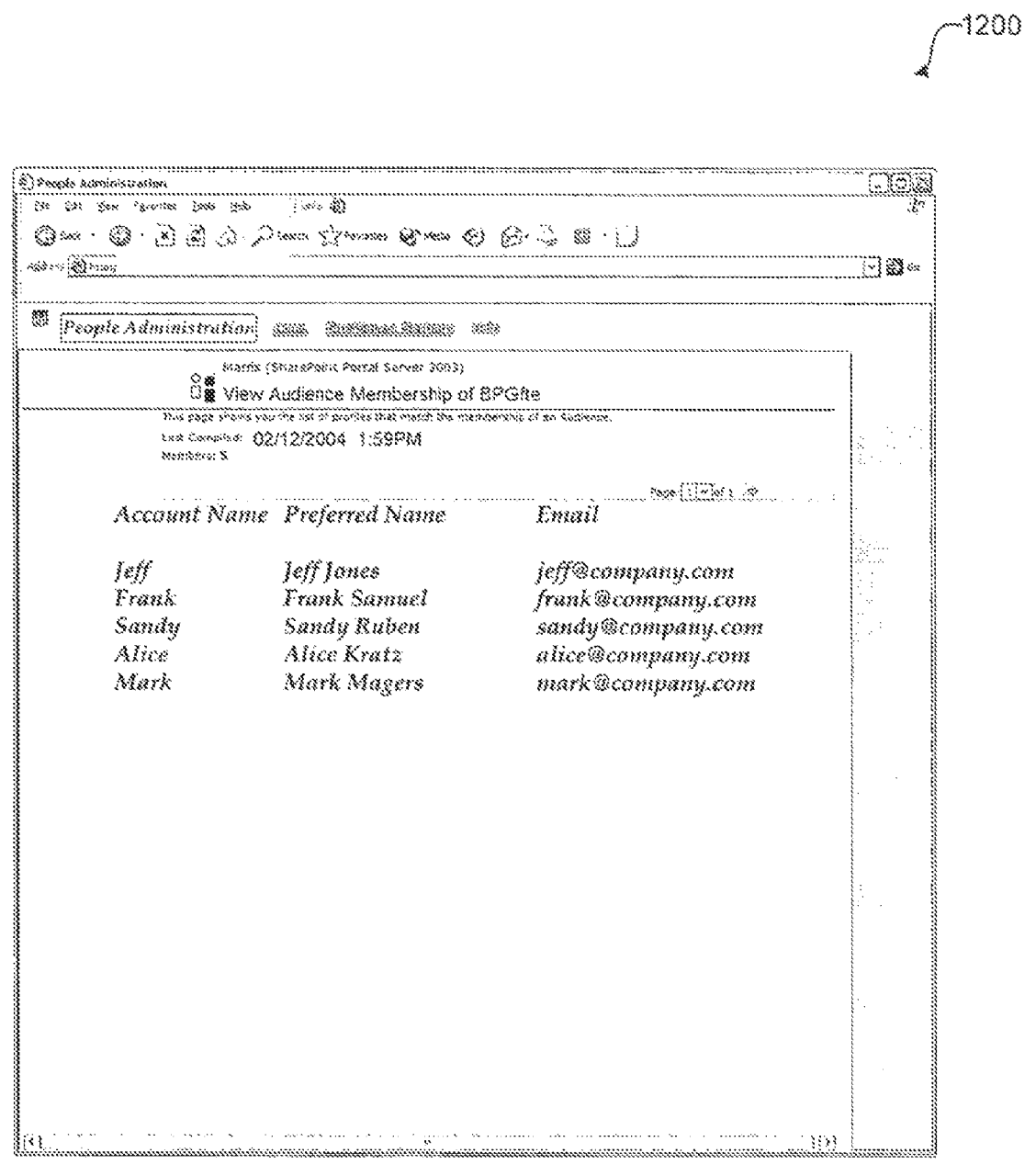

FIG. 12 shows an exemplary view audience membership screen, in accordance with aspects of the present invention. View audience membership screen 1200 shows the individuals that are members of audience BPGfte. Screen 1200 includes the members account name, preferred name, email, last compiled time, and number of members.

Figure 13:
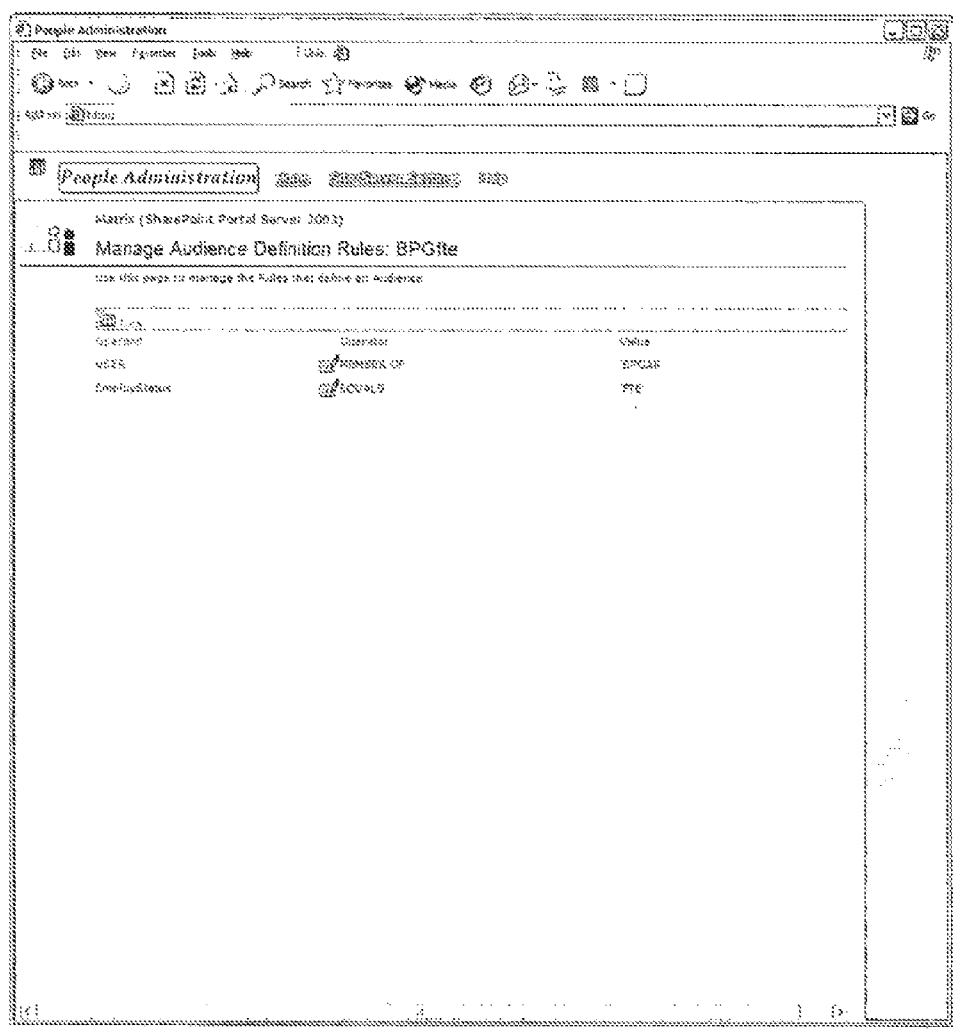
FIG. 13 illustrates an exemplary manage audience definition rules screen.

FIG. 13 illustrates an exemplary manage audience definition rules screen, in accordance with aspects of the present invention. Manage audience definition rules screen 1300 shows all of the rules that make up the Audience definition. Screen 1300 includes an operand column; operator column; and value column.

Figure 14:
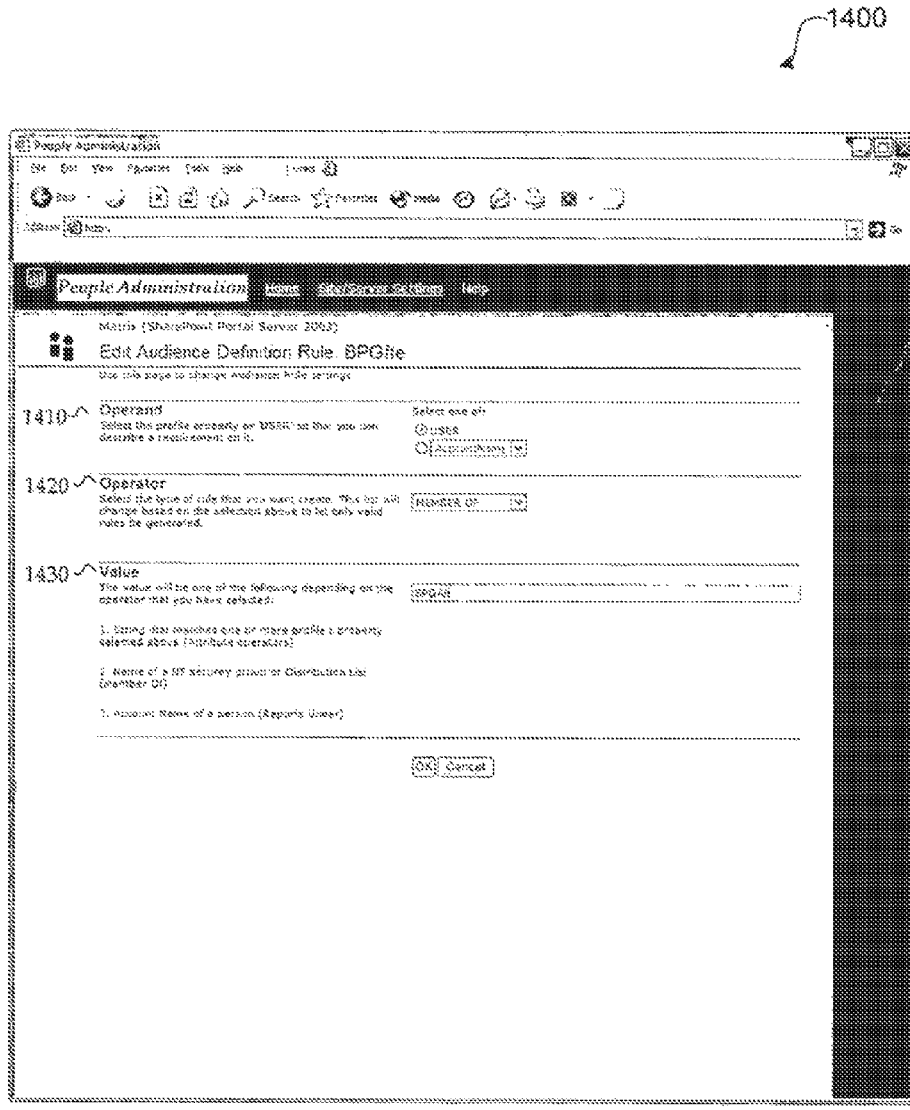
FIG. 14 shows an exemplary edit audience definition rules screen.

FIG. 14 shows an exemplary edit audience definition rules screen, in accordance with aspects of the invention. Edit audience definition rules screen 1400 shows a rule associated with the BPGfte audience. Screen 1400 includes operand section 1410, operator section 1420, and value section 1430. Screen 1400 is populated with the values from each audience rule.

Figure 15:
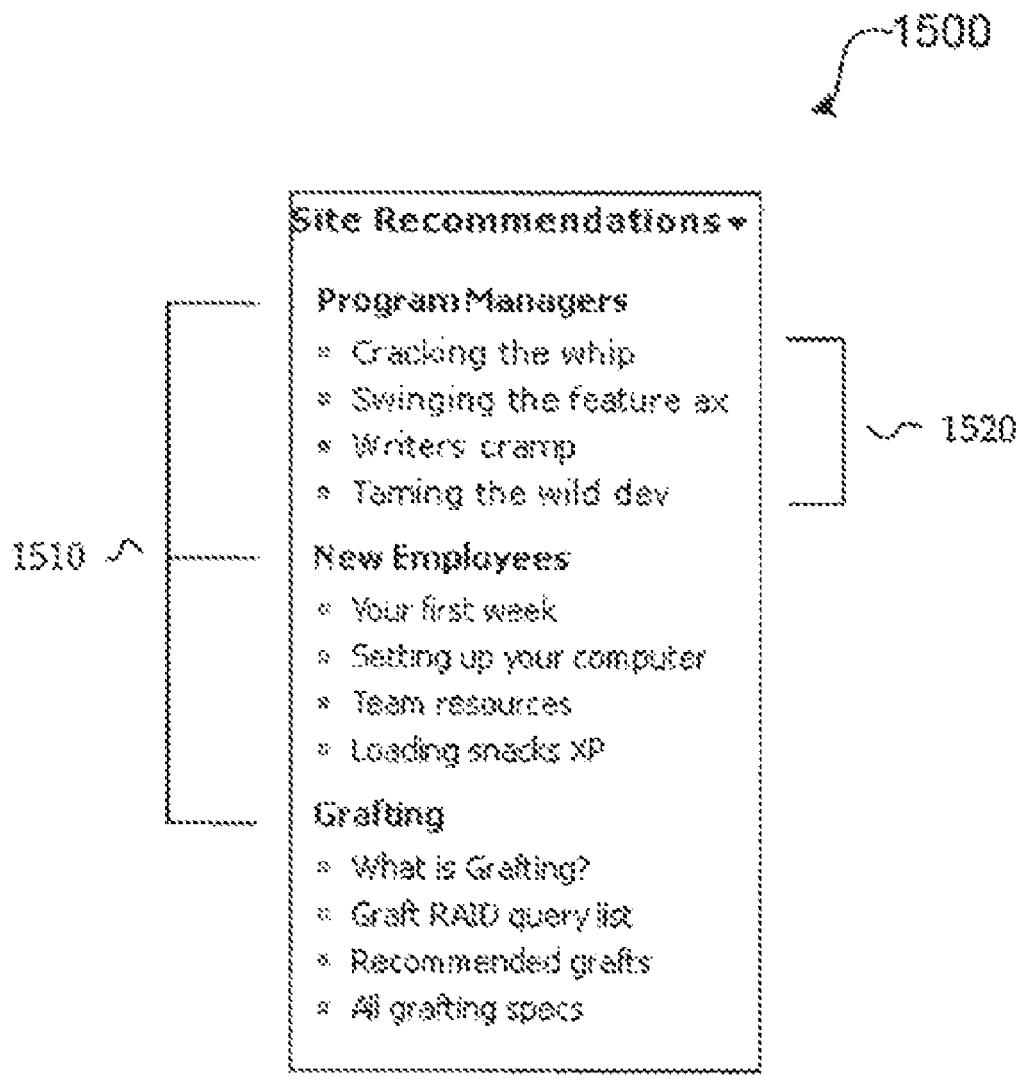
FIG. 15 illustrates an exemplary display showing targeted content, in accordance with aspects of the invention.

FIG. 15 illustrates an exemplary display showing targeted content, in accordance with aspects of the invention.

According to one embodiment, screen 1500 shows audience names as group headings with color and font (1510). The links associated with the targeted content are shown with a category listing title (1520). The number of listings for each of the audience headings can be customized. According to one embodiment, the default number of listings is five for each group heading and the listings are sorted in descending order by their modification date/time.

Each listing is annotated with the targeted audiences to which it is relevant. For example, in a training category, a given class may be a listing that is annotated as relevant to the program managers (PM) and the test targeted audiences.

In order to activate targeted content, a target to audience property is set. When the target to audience property set to empty or null, all users see the content when they access the page. Upon rendering screen 1500, the rendering engine makes a call to an API to determine what web parts to show to the user based on the audiences tagged to the content. For every heading that the return value is True, those parts are instantiated on screen 1500.

This audience property allows the administrator of the Portal to target specific content to particular groups of users. For instance, the New Employees section is automatically shown to all new employees. When the user is no longer a new employee this web part is not displayed to them. Since the rules for the audiences are compiled according to a predetermined schedule, the user will be automatically removed from the new employee audience after a period of time has elapsed.

The following scenarios are presented to further clarify content targeting, in accordance with aspects of the present invention.

Suppose that Vivica is a Software Tester at Microsoft. When she visits her Product Group's portal, she finds a content section showing here a summary of open problems in two views—Active problems opened by her and active problems assigned to her. Her friend Volga, an Event Marketer does not see this content section because she does not work in Vivica's group, but she sees a Marketing Effectiveness content section that tracks Marketing expense vs. Incoming leads.

Suppose that Vikram is a New Hire and a Software Developer at a major software company. When he visits the home page of the company's Internal training portal, he notices that it contains a list of recommended links that take him to the New Hire training category page and the Software Developer training category page. Vikram was automatically shown the content instead of having to navigate through a category tree to find the pages.

When Vikram visits the New Hire training category, he finds that the listings there are highlighted with recommended listings for a Software Developer. He is able to find the training that he is looking for in only a couple of clicks of visiting the home page.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for targeting content to an audience that comprises a plurality of users, the method comprising:
   receiving rules, including a first rule and a second rule, from an administration client computing device, the first rule and the second rule comprising query criteria for the audience;
   storing the received rules;
   scheduling compilation of at least the first rule on a predetermined time schedule that is independent of providing the content to the audience;
   using the received rules to determine a membership list of the plurality of users to receive the content by:
   independently generating separate results of the first rule according to the predetermined time schedule, wherein the separate results of the first rule comprise a first set of users satisfying the first rule; and
   independently generating separate results of the second rule, wherein the separate results of the second rule comprise a second set of users satisfying the second rule;
   after independently generating the separate results of each of the first rule and the second rule, compiling the membership list of users by applying one or more conditional logic operators to combine the separate results of the first rule and the second rule;
   associating the compiled membership list of users with the content; and providing the content to the users listed within the compiled membership list;
   wherein the second rule is a reports under rule and independently generating separate results of the second rule comprises determining if one or more of the plurality of users are located hierarchically under another person within an organization structure, the determination comprising receiving the separate results of the reports under rule from a directory service maintaining the organization structure.

2. The method of claim 1, wherein each of the rules comprises one of: a property query rule, a member of rule, and a reports under rule.

3. The method of claim 1, further comprising:
   displaying a rule-editing screen for editing at least the second rule, the rule editing screen comprising:
   a field for entering an operand of the second rule;
   a field for entering an operator of the second rule, wherein the operator is at least one of an attributes operator, a member of operator, and a reports under operator;
   receiving input in at least the field for entering an operator of the second rule; and
   storing the second rule, including the received input.

4. The method of claim 1, further comprising obtaining the content from one or more data servers.

5. The method of claim 1, wherein scheduling the compilation of at least the first rule on a predetermined time schedule is processed as a SQL job by the database.

6. The method of claim 1, further comprising providing access to the content through a web interface that is created individually for that audience member.

7. The method of claim 1, further comprising storing the rules to define the audience as an XML representation.

8. A system for targeting content to an audience that comprises users, comprising:
  a server computer operably connected to a management client device and a network of computer devices, wherein the server computer includes a processor and memory containing computer executable instructions defining a content targeting application, the content targeting application, when executed by the processor, operates to:
    receive rules, including a first rule and a second rule, from an administration client computing device, the first rule and the second rule comprising query criteria for the audience;
    store the received rules;
    schedule compilation of at least the first rule on a predetermined time schedule that is independent of providing the content to the audience;
  use the received rules to determine a membership list of the plurality of users to receive the content by:
    independently generating separate results of the first rule according to the predetermined time schedule, wherein the separate results of the first rule comprise a first set of users satisfying the first rule; and
    independently generating separate results of the second rule, wherein the separate results of the second rule comprise a second set of users satisfying the second rule;
    after independently generating the separate results of each of the first rule and the second rule, compile the membership list of users by applying one or more conditional logic operators to combine the separate results of the first rule and the second rule;
  associate the compiled membership list of users with the content; and provide the content to the users listed within the compiled membership list;
  wherein the second rule is a reports under rule and independently generating separate results of the second rule comprises determining if one or more of the plurality of users are located hierarchically under another person within an organization structure, the determination comprising receiving the separate results of the reports under rule from a directory service maintaining the organization structure.

9. The system of claim 8, wherein each of the rules comprises one of: a property query rule, a member of rule, and a reports under rule.

10. The system of claim 8, wherein the server computer further operates to display the content to the audience through a web interface.

* * * * *